United States Patent [19]
Yoon et al.

[11] Patent Number: 6,167,105
[45] Date of Patent: *Dec. 26, 2000

[54] SPACER GRID WITH H-SPRING FOR FUEL RODS FOR USE IN NUCLEAR REACTOR FUEL ASSEMBLIES

[75] Inventors: Kyung Ho Yoon; Heung Seok Kang; Hyung Kyu Kim; Kee Nam Song; Youn Ho Jung; Tae Hyun Chun; Dong Seok Oh; Wang Kee In, all of Taejon-si, Rep. of Korea

[73] Assignees: Korea Atomic Energy Research Institute, Taejon-si; Korea Electric Power Corporation, Seoul, both of Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 09/208,290

[22] Filed: Dec. 8, 1998

[30] Foreign Application Priority Data

Dec. 22, 1997 [KR] Rep. of Korea ............... 97-71799

[51] Int. Cl.[7] .................. G21C 3/352; G21C 3/356
[52] U.S. Cl. ................... 376/441; 376/442; 376/462
[58] Field of Search .................. 376/441, 442, 376/462

[56] References Cited

U.S. PATENT DOCUMENTS

| | | | |
|---|---|---|---|
| 4,224,107 | 9/1980 | Delafosse et al. | 176/78 |
| 4,396,573 | 8/1983 | Feutrel | 376/442 |
| 4,702,881 | 10/1987 | Weiland et al. | 376/442 |
| 4,744,942 | 5/1988 | Ferrari et al. | 376/442 |
| 4,923,669 | 5/1990 | DeMario | 376/442 |
| 5,188,797 | 2/1993 | Bryan | 376/438 |
| 5,444,748 | 8/1995 | Beuchel et al. | 376/438 |

*Primary Examiner*—Charles T. Jordan
*Assistant Examiner*—Kjongtaek K. Mun
*Attorney, Agent, or Firm*—Bachman & LaPointe, P.C.

[57] ABSTRACT

A spacer grid with H-springs for use in a nuclear reactor fuel assembly is disclosed. In the spacer grid, two sets of intersectional grid strips are arranged in sets at an angle to each other prior to being encircled by a plurality of perimeter strips, thus forming a plurality of four-walled cells individually placing and supporting an elongated fuel rod therein. A plurality of regularly spaced openings are formed on each of the grid strips and perimeter strips at portions corresponding to the cells. An H-shaped spring is set in each of the openings and has a specifically curved rib capable of being brought into conformal surface contact with a fuel rod placed in each of the cells. The H-shaped spring thus elastically supports the fuel rod. Two positioning dimples are provided on each of the strips at positions above and below each of the openings. The two positioning dimples are so specifically curved as to come into conformal surface contact with a fuel rod, thus elastically supporting the fuel rod in cooperation with the H-shaped springs.

4 Claims, 7 Drawing Sheets

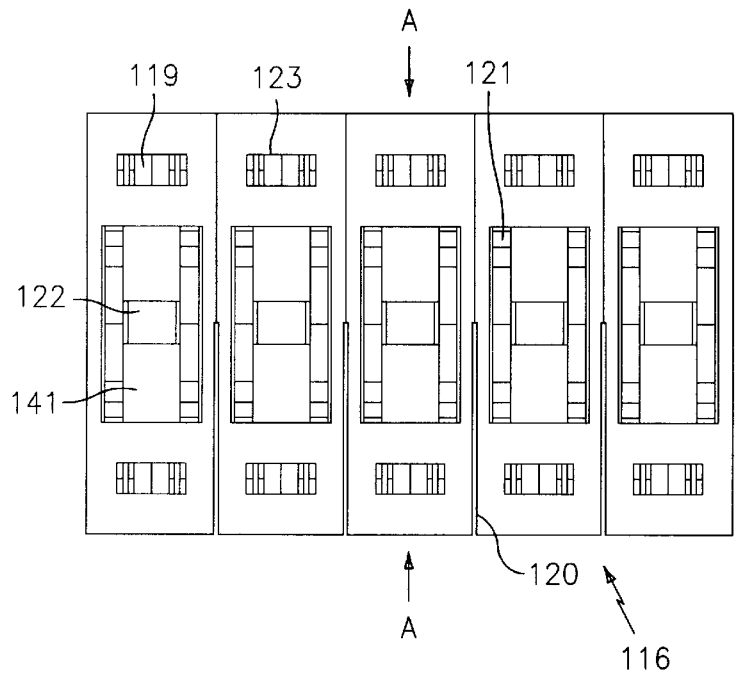
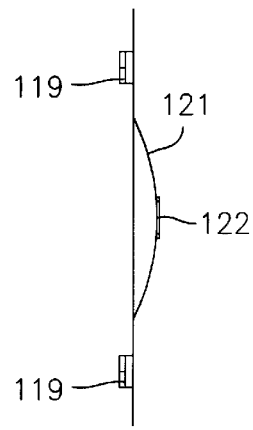
FIG. 11        FIG. 12
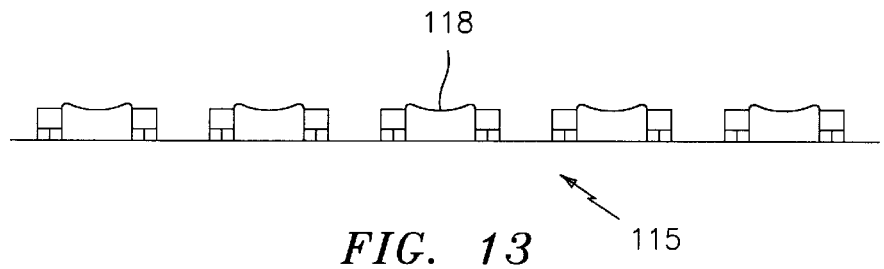
FIG. 13
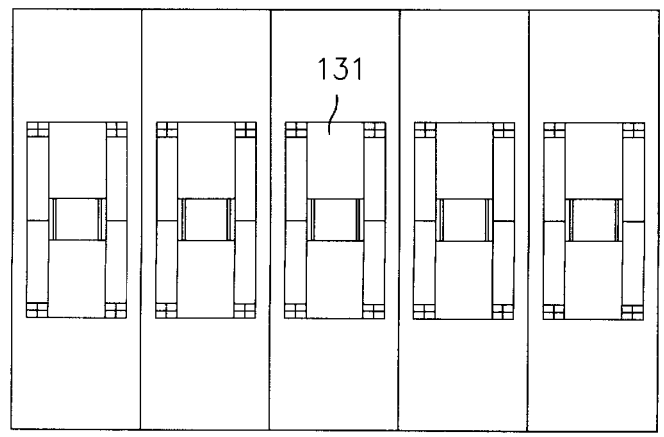
FIG. 14

SPACER GRID WITH H-SPRING FOR FUEL RODS FOR USE IN NUCLEAR REACTOR FUEL ASSEMBLIES

BACKGROUND OF THE INVENTION

1. Field of the Invention

The present invention relates, in general, to spacer grids used for placing and supporting fuel rods in nuclear reactor fuel assemblies and, more particularly, to a spacer grid with both H-springs, individually having a curved middle portion conformal with the surface of each fuel rod, and a positioning dimple having the same radius of curvature as that of each fuel rod, thus being brought into conformal surface contact with the fuel rods and thereby accomplishing soundness of fuel rods within the fuel assembly regardless of any impact acting on the fuel rods, the grid also effectively protecting the fuel rods from fretting corrosion even when gaps are formed between the fuel rods and the positioning springs and dimples.

2. Description of the Prior Art

As well known to those skilled in the art, spacer grids are positioning elements for placing and supporting a plurality of elongated fuel rods within a nuclear fuel assembly. In each of the spacer grids, two sets of intersectional grid strips are arranged in sets at an angle to each other prior to being encircled by perimeter strips, thus forming a plurality of four-walled cells for fuel rods. In each of the cells of a spacer grid, a plurality of positioning springs and dimples are provided on the strips, thus elastically placing and supporting each fuel rod within the cell. When the support force provided by the positioning springs and dimples is less than a specific level, the springs and dimples fail to effectively place and support the fuel rods at desired positions, thus failing to accomplish soundness of the fuel rods within the fuel assemblies. On the contrary, when the support force provided by the positioning springs and dimples is exceedingly higher than the reference level, the springs and dimples undesirably cause frictional damage, such as scratches, to the surfaces of the fuel rods when inserting the fuel rods into the cells of the spacer grids. The positioning springs and dimples, with such exceedingly high support force, also fail to allow the fuel rods to smoothly slide on the springs and dimples when the fuel rods are elongated due to neutron irradiation induced growth during an operation of a reactor. In such a case, the fuel rods are bent.

When the fuel rods are undesirably bent as described above, the fuel rods reduce the intervals between them or come into contact with each other, thus reducing the cross-sectional area of the coolant passages defined between the fuel rods within the fuel assembly or blocking said passages. This prevents heat from being effectively transferred from the fuel rods to coolant, thus causing the fuel rods to be partially overheated and thereby causing a nuclear boiling separation of the fuel rods. This results in reduction in the output power of the nuclear fuel.

Nuclear fuel, having a high burn-up and zero defect, has been actively studied recently. The primary method of producing the nuclear fuel having a high burn-up is to improve the thermal property of the nuclear fuel. That is, the fuel assembly is designed to improve the heat transferring effect between the fuel rods and the coolant. In order to accomplish the above object, the flow property of the coolant about the fuel rods has to be improved. Such an improvement in the flow property of the coolant may be accomplished by changing the structural design of the spacer grids. For example, the spacer grids may be provided with so-called "mixing deflectors" or "vanes". The flow property of coolant may be further improved in accordance with the configuration of such mixing deflectors or vanes. In addition, the flow property of the coolant is also improved by designing the coolant passages to allow the coolant to more effectively flow within the assembly.

However, the means for improving the thermal property of the nuclear fuel is designed to form a turbulent flow of the coolant about the fuel rods and this causes the elongated fuel rods to be vibrated during an operation of a reactor. Such a vibration of the fuel rods causes the fuel rods to repeatedly slide on the positioning springs and dimples of the spacer grids, and so the fuel rods are partially abraded at the contact surfaces where the fuel rods are brought into contact with the positioning springs and dimples of the grids. That is, the vibration of the fuel rods, caused by the turbulent flow of the coolant, results in fretting wear of the fuel rods. It is thus noted that the means for improving the thermal property of the nuclear fuel also undesirably causes damage or fretting wear to the fuel rods. The above-mentioned fretting wear is caused by a fatigue fracture or a fatigue wear which is caused by cracks and growth of said cracks, the cracks being formed on the contact surfaces of the fuel rods when the fuel rods are vertically and/or laterally vibrated with infinitesimal amplitude relative to the positioning springs and dimples while being pressurized by a contact pressure at the contact surfaces between the fuel rods and the positioning springs and dimples.

In a nuclear fuel assembly, the fuel rods are placed and supported within cells of grids by positioning springs and dimples as described above. In addition, the contact pressure, acting on the contact surfaces of the fuel rods, are caused by both the spring force of the positioning springs and the reaction force of the positioning dimples. The infinitesimal amplitude vertical and/or lateral vibration of the fuel rods is caused by the turbulent flow of the coolant within the fuel assembly. From a microscopic point of view, such a fretting wear is the growth behavior of cracks, and so the fuel rods can be free from such fretting wear when the spacer grid is designed to protect the contact surfaces of the fuel rods from such cracks.

FIG. 1 is a perspective view, showing the construction of a typical nuclear fuel assembly. As shown in the drawing, the fuel assembly 1 comprises a plurality of elongated, closely spaced and parallel fuel rods 9. The fuel rods 9 are placed and supported within the assembly 1 by a plurality of spacer grids 7 and 8. The top and bottom of the fuel assembly 1 are covered with pallets 2 and 3, respectively, and so the assembly 1 is protected from any external loads acting on the top and bottom thereof. The pallets 2 and 3 and the spacer grids 7 and 8 are integrated into a single structure using a plurality of guide tubes 4. A framework of the assembly 1 is thus fabricated. In the above assembly 1, the spacer grids 7 and 8 are laterally arranged along the axes of the guide tubes 4 while being regularly spaced from each other. The above spacer grids 7 and 8 are welded to the guide tubes 4, thus being integrated into a fuel assembly 1.

FIGS. 2a and 2b show a typical Inconel spacer grid for use in nuclear fuel assemblies. The above spacer grid 7 is fabricated by arranging two sets of intersectioal grid strips at right angles to each other, thus forming a plurality of four-walled cells. The above cells include two types of cells: fuel rod cells 13 used for placing and supporting the fuel rods 9 within the grid 7 and guide tube cells 14 used for placing and supporting the guide tubes 4 within said grid 7. Each of the fuel rod cells 13 has two positioning springs 18 and four positioning dimples 19, thus forming six support points. Each fuel rod 9 is thus supported by an associated fuel rod cell 13 while being brought into point contact or linear contact with the cell 13 at six points.

FIG. 3 is a perspective view, showing a fuel rod 9 which is placed and supported by a spacer grid while being brought into point or linear contact with an associated fuel rod cell at six points. As shown in the drawing, at the initial stage, the positioning springs 18 and dimples 19 have a stable support structure without having any gap at the contact points between the fuel rods and the springs and dimples. However, a gap may be formed at each of said contact points during an operation of the fuel assembly, thus breaking the stable support structure of the positioning springs and dimples. Such a gap causes the spacer grid to lose its original function of placing and supporting the fuel rods within the fuel assembly.

FIGS. 4a and 4b show the configuration of the typical positioning springs and dimples of a spacer grid used for supporting the fuel rods. As shown in the drawings, the positioning springs 18 and dimples 19 are brought into nonconformal contact with the fuel rods 9. Such a nonconformal contact between the fuel rods 9 and the positioning springs 18 and dimples 19 may cause damage to the fuel rods 9 due to a contact load repeatedly applied to the fuel rods 9 when a gap is formed at the contact points between the fuel rods 9 and the positioning springs 18 and dimples 19.

It is thus preferable to design the spacer grids to effectively protect the fuel rods from fretting wear and to stably support the fuel rods within the cells without failure for the expected life span of the fuel rods.

In order to protect the fuel rods from fretting wear, the spacer grid has to be designed to be free from causing such a fretting wear of the fuel rods. However, it has been noted that the fretting wear is primarily caused by a gap undesirably formed between the fuel rods and the positioning springs and dimples. Such a gap is formed due to (1) a reduction in the spring force of the positioning springs due to neutron irradiation during an operation of the reactor, (2) a difference in the thermal expansion between the fuel rods and the spacer grids, and (3) a reduction in the diameter of the fuel rods due to cladding creep of each fuel rod. When such gaps are formed between the fuel rods and the positioning springs and dimples, the fuel rods are repeatedly moved relative to the springs and dimples, thus coming into intermittent contact with the springs and dimples. This causes fretting wear of the fuel rods.

In order to allow the spacer grids to stably support the fuel rods, thus accomplishing soundness of the fuel rods within a fuel assembly for the expected life span of the fuel rods, it is necessary to design the positioning springs to elastically support the fuel rods against the positioning dimples with a sufficient spring force. However, it has been noted that the positioning springs and dimples gradually lose the designed spring force due to neutron irradiation during an operation of a reactor. This forms gaps between the fuel rods and the positioning springs and dimples. The gaps cause the fuel rods to be vibrated vertically and/or laterally due to a circulation of coolant within a fuel assembly. It is, thus, impossible to accomplish soundness of the fuel rods within the fuel assembly.

SUMMARY OF THE INVENTION

Accordingly, the present invention has been made keeping in mind the above problems occurring in the prior art, and an object of the present invention is to provide a spacer grid for use in nuclear fuel assemblies, of which the positioning springs and dimples are designed to be brought into conformal surface contact with the fuel rods, thus effectively distributing the contact pressure at the contact surfaces of the fuel rods and relieving the fuel rods from vibrations and thereby protecting the fuel rods from fretting wear, and which is also designed to enlarge the acceptable range of elastic behavior of the positioning springs, thus allowing the fuel rods to be stably supported by the remaining spring force of the positioning springs and thereby accomplishing soundness of the fuel rods within the fuel assembly.

Another object of the present invention is to provide a spacer grid for use in nuclear fuel assemblies, of which the positioning springs and dimples are brought into surface contact with the fuel rods, thus more stably supporting the fuel rods in comparison with typical spacer grids where the fuel rods are supported within the cells while being brought into point contact or line contact with the cells at five or six points, the springs and dimples being also designed to be free from reducing the cross-sectional area of the coolant passages, thus allowing the coolant to smoothly and uniformly flow around the fuel rods, and which is designed to enlarge the contact area between the fuel rods and the positioning springs and dimples, thus uniformly distributing the load acting on the contact surfaces between the fuel rods and the positioning springs and dimples and thereby reducing the peak stress at said contact surfaces, and which stably places and supports the fuel rods regardless of a variation in the force and pressure field acting on the fuel rods in any direction.

A further object of the present invention is to provide a spacer grid for use in nuclear fuel assemblies, of which the positioning springs and dimples are smoothly rounded at the the top and bottom edge of the middle curved portions of the springs and at the top and bottom edges of the dimples, thus being free from causing any damage, such as scratches, to the surface of the fuel rods when the fuel rods are inserted into or removed from the cells of the grid.

In order to accomplish the above objects, the present invention provides a spacer grid for use in a nuclear fuel assembly, comprising two sets of intersectional grid strips arranged in sets at an angle to each other prior to being encircled by a plurality of perimeter strips, thus forming a plurality of four-walled cells individually placing and supporting an elongated fuel rod therein, further comprising; a plurality of regularly spaced openings formed on each of the grid strips and perimeter strips at portions corresponding to the cells; an H-shaped spring set in each of said openings, thus elastically supporting a fuel rod placed in each of the cells; and two positioning dimples provided on each of said strips at positions above and below each of the openings, thus cooperating with the H-spring in order to support a fuel rod within each of said cells.

BRIEF DESCRIPTION OF THE DRAWINGS

The above and other objects, features and other advantages of the present invention will be more clearly understood from the following detailed description taken in conjunction with the accompanying drawings, in which:

FIG. 2b is a front view of the spacer grid of FIG. 2a;

FIG. 4b is a front view of the cell of FIG. 4a;

FIG. 8 is a perspective view of a dimple provided in the cells of the spacer grid of FIG. 6a;

FIG. 11 is a front view of the grid strip of FIG. 10;

FIG. 12 is a cross-sectional view of the above grid strip taken along the line A—A of FIG. 11;

FIG. 13 is a plan view of one of perimeter strips of the spacer grid with a plurality of H-springs of FIG. 7 being provided on said perimeter strip; and FIG. 14 is a front view of the perimeter strip of FIG. 13.

DESCRIPTION OF THE PREFERRED EMBODIMENTS

Figure 1:
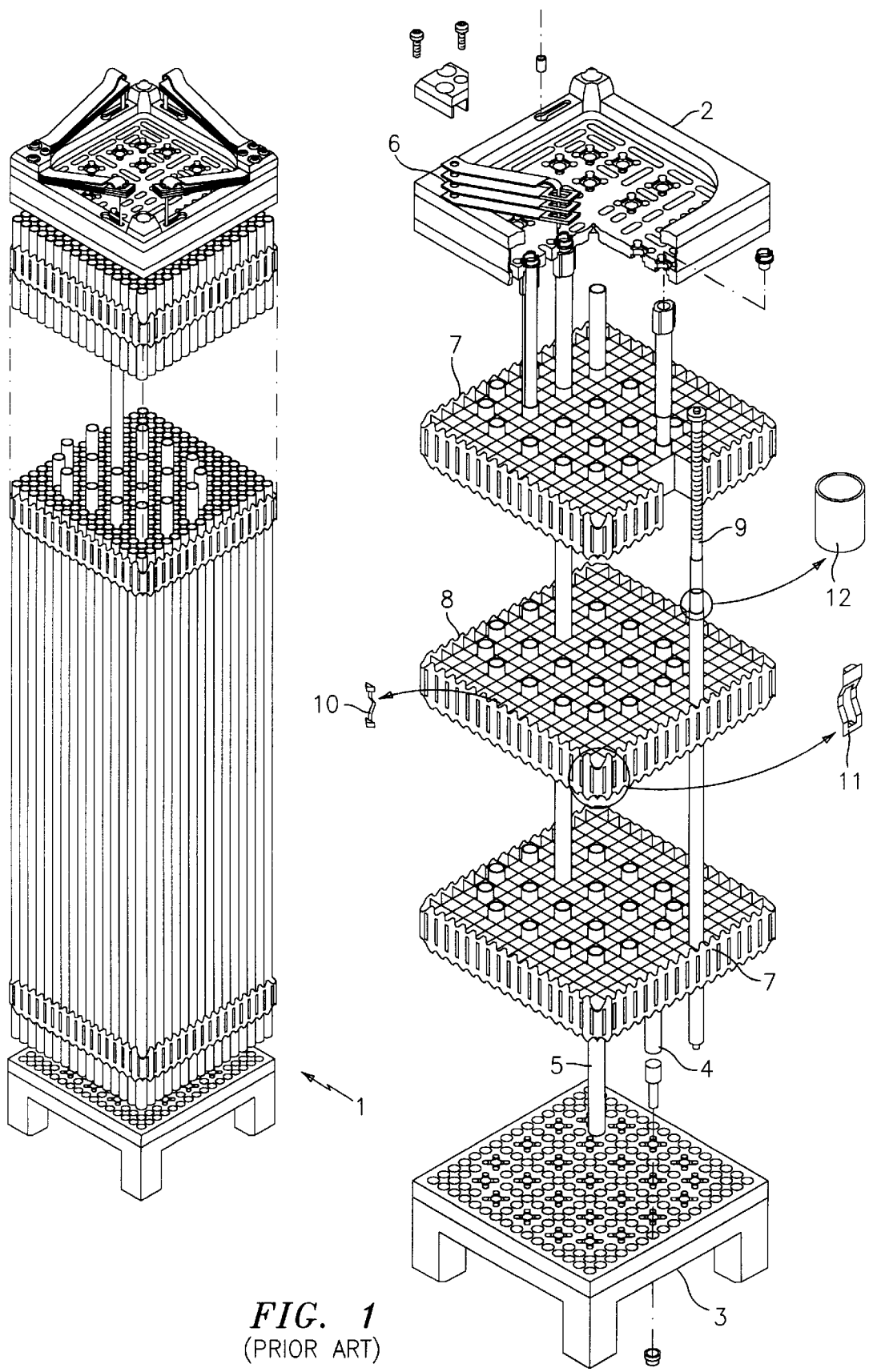
FIG. 1 is a partially broken perspective view, showing the construction of a typical nuclear fuel assembly for use in reactors.
Figure 2A:
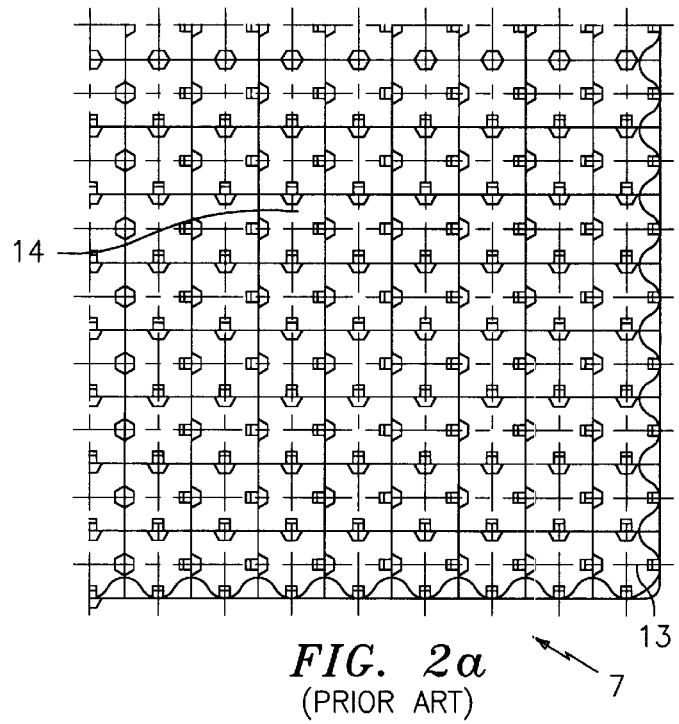
FIG. 2a is a plan view of a spacer grid included in the fuel assembly of FIG. 1.
Figure 2B:
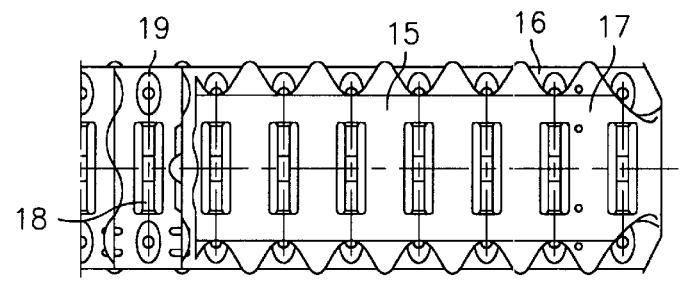
Figure 3:
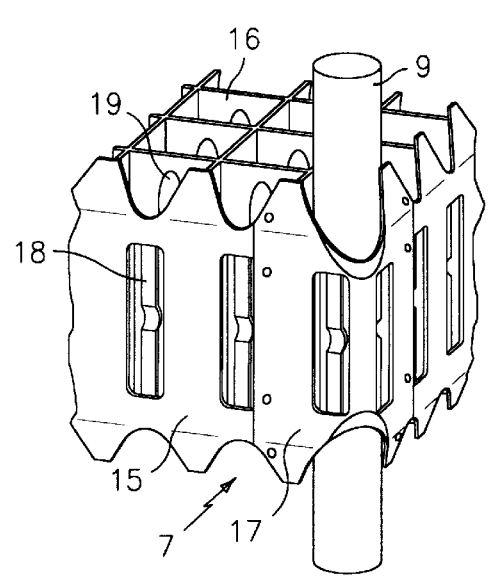
FIG. 3 is a perspective view, showing a fuel rod placed and supported by the typical spacer grid while being brought into point or line contact with an associated fuel rod cell of said grid at six points.
Figure 4A:
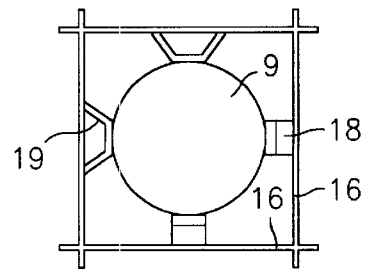
FIG. 4a is a plan view of a cell of the typical grid with a fuel rod being supported by positioning springs and dimples within said cell.
Figure 4B:
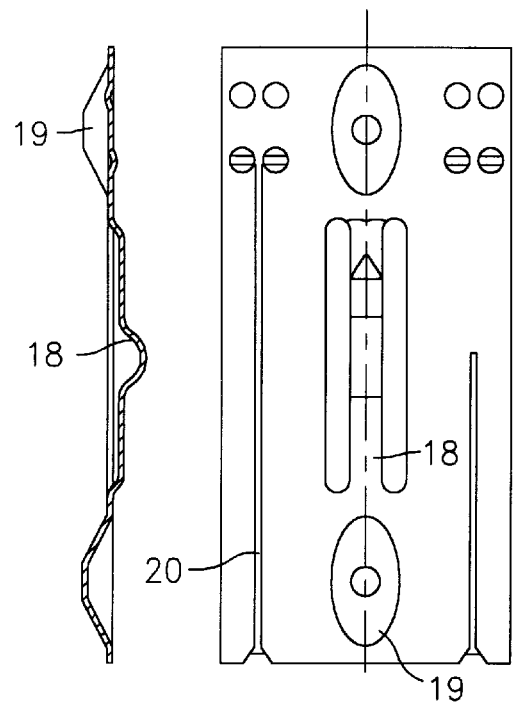
Figure 5:
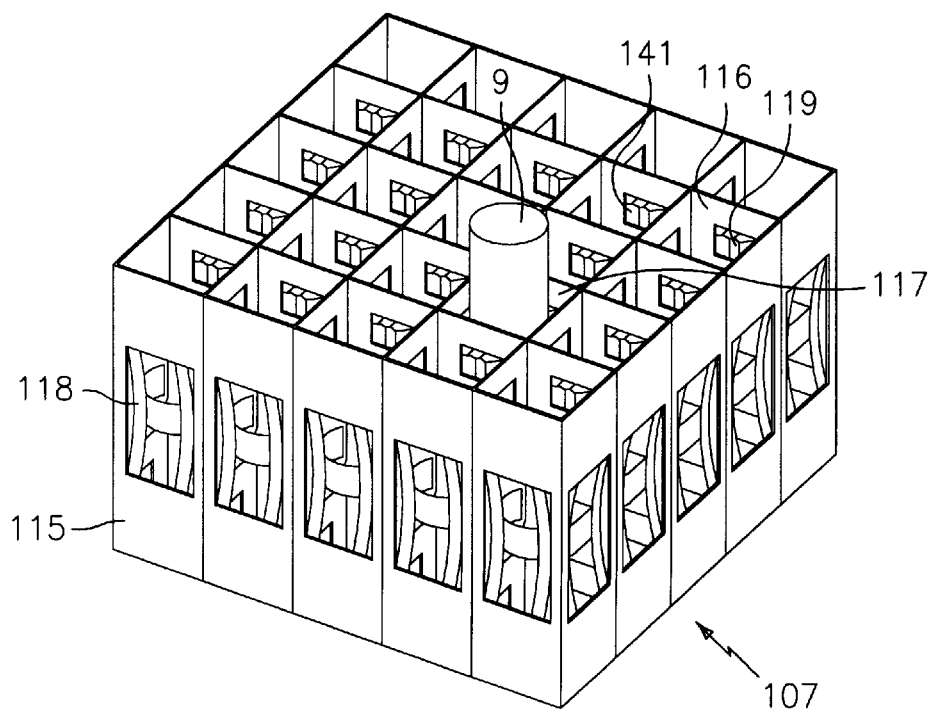
FIG. 5 is a perspective view, showing a fuel rod placed and supported by a spacer grid of this invention while being brought into conformal surface contact with positioning springs and dimples of an associated fuel rod cell of said grid.

FIG. 5 is a perspective view, showing a fuel rod placed and supported by a spacer grid of this invention while being brought into conformal surface contact with positioning springs and dimples of an associated fuel rod cell of said grid. As shown in the drawing, the spacer grid 107 of this invention is fabricated by arranging two sets of intersectional grid strips 116 at right angles to each other prior to being encircled by four perimeter strips 115, thus forming a plurality of four-walled cells 117 for fuel rods 9. The above cells 117 individually have an H-spring 118 at each wall thereof, thus effectively placing and supporting an elongated fuel rod 9 while protecting the fuel rod 9 from fretting wear.

Figure 6A:
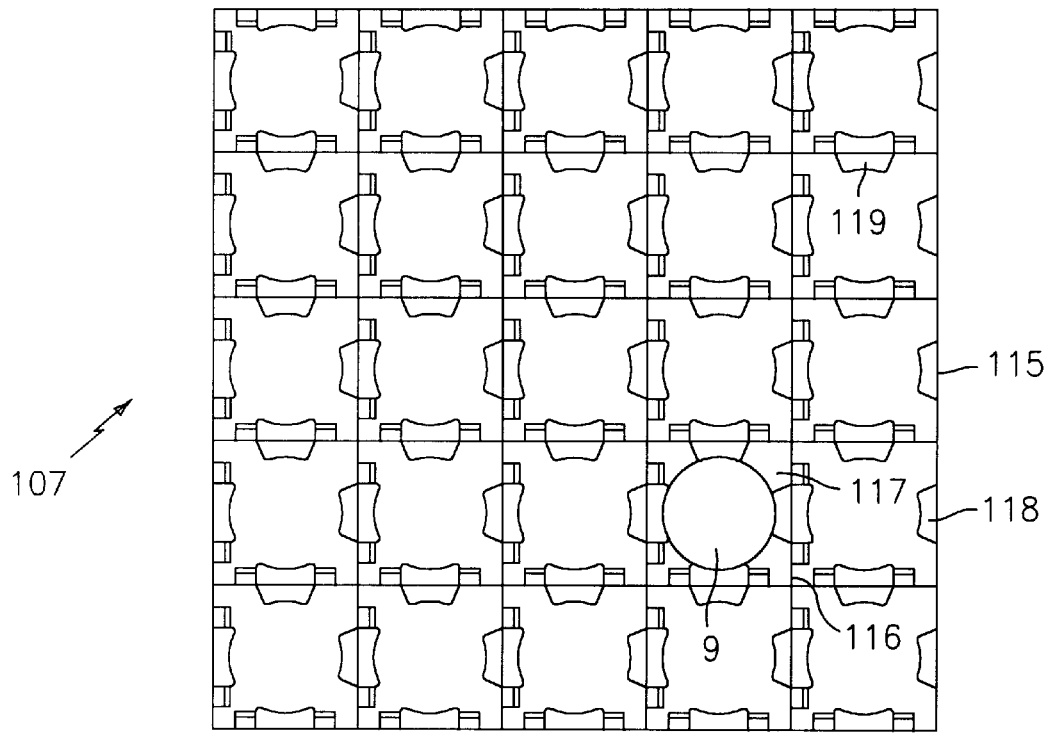
FIG. 6a is a plan view of the spacer grid of this invention with a plurality of H-springs and dimples being provided in each cell of the grid.
Figure 6B:
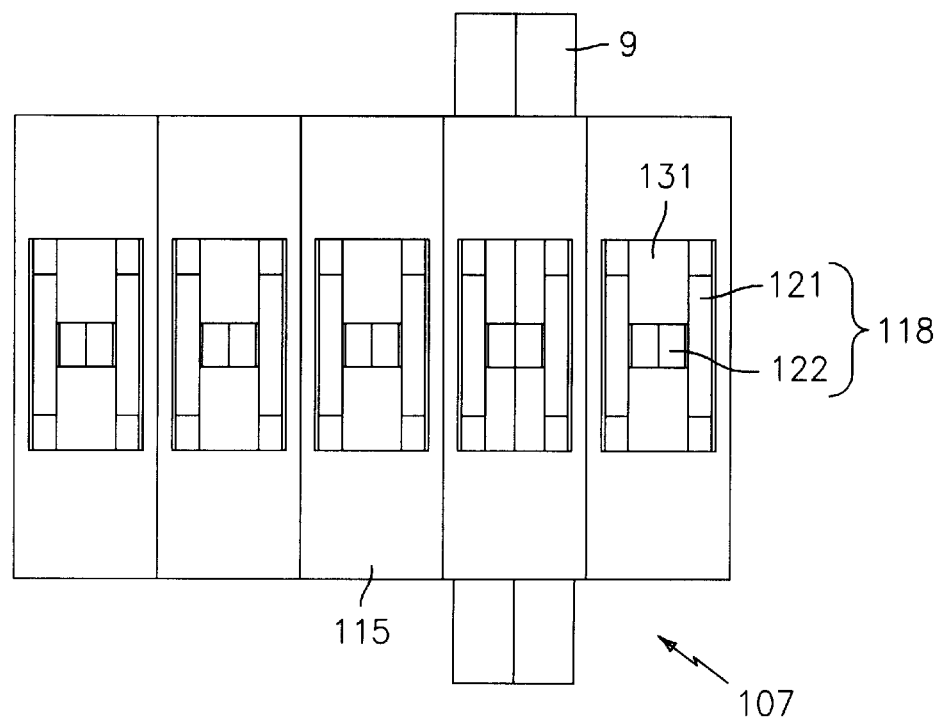
FIG. 6b is a front view of the spacer grid of this invention with one fuel rod being placed and supported within a cell by the H-springs.

In the spacer grid 107 of this invention, the two sets of intersectional grid strips 116 individually have a plurality of regularly spaced first openings 141 as best seen in FIG. 11, while each of the perimeter strips 115 has a plurality of regularly spaced second openings 131 as best seen in FIGS. 6b and 14. The above openings 131 and 141, having a rectangular configuration and transversely formed on the strips 115 and 116 at regularly spaced portions, are individually provided with an H-spring 118 capable of supporting a fuel rod 9 while protecting the fuel rod 9 from fretting wear. The intersectional grid strips 116 are also provided with two positioning dimples 119 at positions above and below each of said first openings 141. The positioning dimples 119, provided on each grid strip 116, are projected from each grid strip 116 in a direction opposite to that of the H-springs 118 set in said first openings 141. However, the perimeter strips 115 of the grid 107 are free from such dimples 119. The arrangement of both the H-springs 118 and the dimples 119 in the spacer grid 107 of this invention is shown in FIG. 6a.

Figure 7:
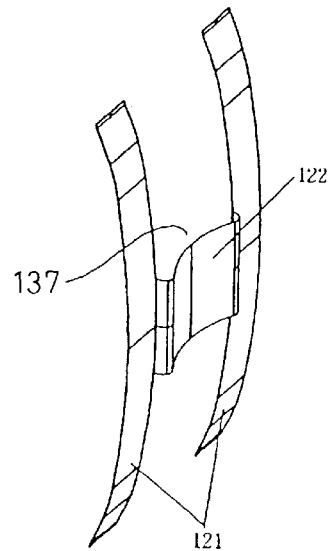
FIG. 7 is a perspective view of an H-spring provided in the cells of the spacer grid of FIGS. 6a and 6b.

FIG. 6b is a front view of the spacer grid 107 of this invention with one fuel rod 9 being placed and supported within a four-walled cell 117 by the H-springs 118. As shown in the drawing, each of the H-springs 118 comprises two bowed arms 121 which are set along opposite longitudinal sides of each of the openings 131 and 141. A specifically curved rib 122 extends between the middle portions of the two arms 121, thus integrating the two bowed arms 121 into a single structured, H-shaped spring 118. As best seen in FIG. 7, the two arms 121 of each of the H-springs 118 are bowed in the same direction, thus having an elasticity capable of elastically supporting a fuel rod 9 within each cell 117. On the other hand, the rib 122, extending between the two arms 121, is so specifically curved as to have the same radius of curvature as that of each fuel rod 9 as shown in FIGS. 6a and 9a. The H-springs 118 thus effectively support the fuel rods 9 within the four-walled cells 117 of the grid 107 while protecting the fuel rods 9 from fretting wear. The dimples 119, provided on the grid strips 116, are specifically curved in a way such that the dimples 119 are brought into conformal surface contact with the fuel rods 9 as shown in FIGS. 6a, 8 and 9a.

FIG. 7 is a perspective view of one H-spring 118 provided in the cells 117 of the spacer grid 107 of this invention. The two bowed arms 121 of each spring 118 are for supporting the elastic behavior of a fuel rod 9. The rib 122, extending between the two arms 121, is so specifically curved as to have the same radius of curvature as that of each fuel rod 9, thus being brought into conformal surface contact with the fuel rod 9.

Figure 8:
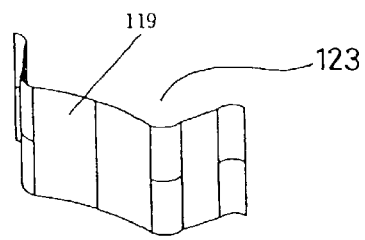
Figure 9A:
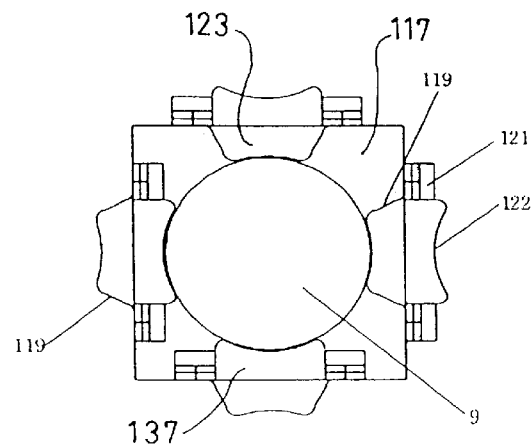
FIG. 9a is a plan view of one cell of the spacer grid of FIG. 5 with one fuel rod being placed and supported within said cell.

FIG. 8 is a perspective view of a positioning dimple 119 provided in the cells 117 of the spacer grid 107. The dimples 119, exclusively provided on the grid strips 116 and projected from the grid strips 116 in a direction opposite to that of the H-springs 118 set in the first openings 141, are specifically curved in a way such that the dimples 119 are brought into conformal surface contact with the fuel rods 9 in the same manner as that described for the ribs 122 of the H-springs 118. Since the springs 118 and dimples 119 have the same radius of curvature as that of the fuel rods 9, they stably support the fuel rods 9 even when the fuel rods 9 are loaded in any direction during an operation of a reactor.

Figure 9B:
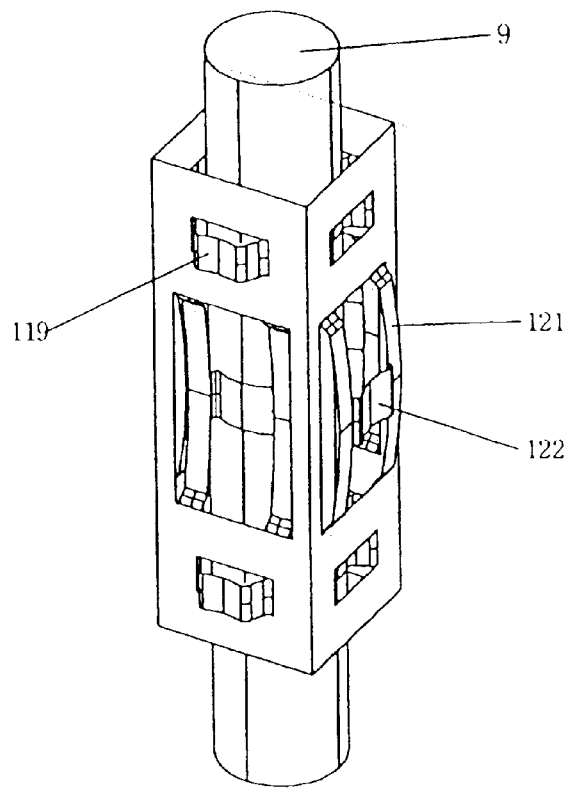
FIG. 9b is a perspective view of one cell of the spacer grid of FIG. 5 with one fuel rod being placed and supported within said cell.

FIGS. 9a and 9b show both the H-springs 118 and the dimples 119 which are brought into conformal surface contact with one fuel rod 9 within a cell 117 of the spacer grid 107.

Figure 10:
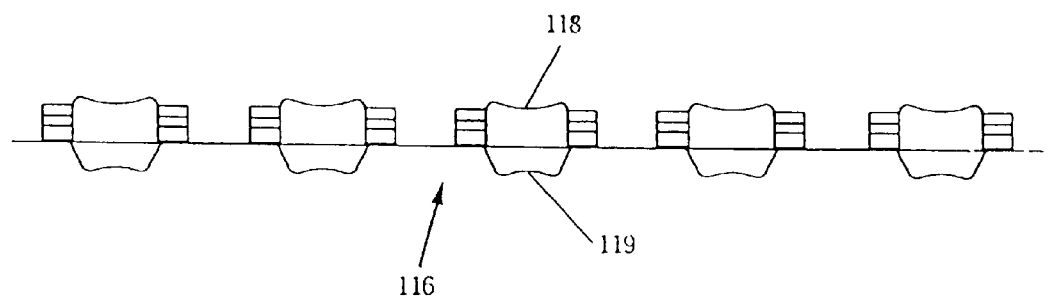
FIG. 10 is a plan view of one of intersectional grid strips of the spacer grid with a plurality of H-springs of FIG. 7 being provided on said grid strip.

FIG. 10 is a plan view of a grid strip 116 which is used for fabricating a spacer grid 107 having a 5×5 array. The above grid strip 116 has five H-springs 118 and five pairs of dimples 119.

FIG. 11 is a front view of the grid strip 116 of FIG. 10. As shown in the drawing, the grid strip 116 has five openings 141 at regularly spaced portions with an H-spring 118 being set in each of the five openings 141. The grid strip 116 is also provided with two positioning dimples 119 at positions above and below each of said openings 141. The positioning dimples 119 are projected from the grid strip 116 in a direction opposite to that of the H-springs 118 set in the openings 141. The ribs 122 of the H-springs 118 and the dimples 119 are individually made of a specifically curved, thin plate, thus forming a passage 137, 123 between a strip 116, 115 and each rib 122 or each dimple 119. The ribs 122 and dimples 119 thus allow coolant to smoothly pass through without being interfered with the ribs 122 or the dimples 119. The grid strip 116 has a plurality of notches 120 at regularly spaced positions between the openings 141. The two sets of intersectional grid strips 116 are thus arranged at an angle to each other at said notches 120, thus forming a spacer grid 107 with a plurality of four-walled cells 117.

FIG. 12 is a cross-sectional view of the above grid strip 116 taken along the line A—A of FIG. 11. As shown in the drawing, the projecting directions of both the H-springs 118 and the dimples 119 are opposite to each other. This drawing also shows both the curvature of the two bowed arms 121 of each spring 118 and the height of the ribs 122 from the bowed arms 121.

FIG. 13 is a plan view of a perimeter strip 115 which is used for fabricating a spacer grid 107 having a 5×5 array. As shown in the drawing, the perimeter strip 115 has five openings 131 at regularly spaced portions. One H-spring 118 is set in each of the five openings 131 in a way such that each spring 118 is bowed inwardly with respect to the spacer grid 107. The perimeter strip 115 is free from any dimple 119 different from the intersecting grid strips 116.

FIG. 14 is a front view of the perimeter strip 115 of FIG. 13. As shown in the drawing, the perimeter strip 115 is free from any dimple 119, and so it is possible to change the effective length of the H-springs 118 set in the openings 131. Since the perimeter strips 115 do not need any seats for the dimples 119, the strips 115 may be more freely designed while considering the strength of the spacer grid 107.

As described above, the present invention provides a spacer grid with H-springs for use in nuclear fuel assemblies. In the spacer grid of this invention, the positioning springs and dimples are not brought into point or line contact with the fuel rods, but come into conformal surface contact with said fuel rods, thus more stably supporting the fuel rods even when the fuel rods are undesirably loaded in any direction during an operation of a reactor. Due to the conformal surface contact between the fuel rods and the positioning springs and dimples, the spacer grid of this invention effectively protects the fuel rods from fretting wear even when a load is repeatedly applied to the contact parts between the fuel rods and the positioning springs and dimples. The position and springs and dimples are so specifically designed as to be free from disturbing the flow of coolant within the fuel assembly, thus uniformly cooling the fuel rods within said fuel assembly.

In the preferred embodiment of this invention, the spacer grid is used with a nuclear fuel assembly. However, it should grid is used with a nuclear fuel assembly. However, it should be understood that the spacer grid of this invention may be also preferably used for placing and supporting a large number of closely spaced, elongated pipes in a system, using boilers or heat exchangers, while effectively protecting the pipes from frictional wear or fatigue fracture.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spacer grid for use in a nuclear reactor fuel assembly, comprising two sets of intersectional grid strips arranged in sets at an angle to each other prior to being encircled by a plurality of perimeter strips, thus forming a plurality of four-walled cells individually placing and supporting an elongated fuel rod therein, further comprising;

a plurality of regularly spaced openings formed on each of said grid strips and perimeter strips at portions corresponding to the cells;

an H-shaped spring set in each of said openings; thus elastically supporting a fuel rod placed in each of said cells; and two positioning dimples provided on each of said strips at positions above and below each of said openings, thus cooperating with the H-spring in order to support a fuel rod within each of said cells, said H-shaped spring comprising;

two bowed arms set along opposite longitudinal sides of each of said openings, thus extending along the axes of the fuel rods; and a specifically curved rib extending between said two arms, thus integrating the two bowed arms into a single structured, H-shaped spring, said rib having no additional structural member extending upwardly or downwardly therefrom so as to allow for free flow of coolant through the opposed openings defined by the rib and two bowed arms without interference from an additional structural member, said rib being curved so as to have the same radius of curvature as that of each of said fuel rods, thus being brought into surface contact with each of said fuel rods, each of said positioning dimples being curved so as to have the same radius of curvature as that of each of said fuel rods, thus being brought into surface contact with each of said fuel rods, said specifically curved rib of the H-shaped spring and each of said positioning dimples being individually curved so as to be brought into conformal surface contact with each of said fuel rods and individually made of a curved, thin plate, thus forming a passage between each of said strips and each of said rib and dimples and thereby allowing coolant to smoothly pass through the spacer grid without being interfered with the rib or the dimples.

2. The spacer grid according to claim 1, wherein each of said perimeter strips is free from any positioning dimple with the H-shaped springs of said perimeter strips being set in the openings of the perimeter strips in a way such that the springs are bowed inwardly with respect to the spacer grid.

3. The spacer grid according to claim 1, wherein the grid strips and the perimeter strips are made of a zircaloy or Inconel alloy.

4. The spacer grid according to claim 1, wherein the rib of the H-shaped spring and each of said positioning dimples are individually smoothed at the top and bottom edges through a rounding process or are individually bent in a direction away from an associated fuel rod, thus being free from causing damage to the fuel rods.

* * * * *